(12) United States Patent
Nguyen et al.

(10) Patent No.: US 12,372,625 B2
(45) Date of Patent: Jul. 29, 2025

(54) POSITION CAPTURING DEVICE FOR A LIGHT SIGNAL REDIRECTION DEVICE OF AN OPTICAL MEASUREMENT APPARATUS FOR CAPTURING OBJECTS, LIGHT SIGNAL REDIRECTION DEVICE, MEASUREMENT APPARATUS AND METHOD FOR OPERATING A POSITION CAPTURING DEVICE

(71) Applicant: Valeo Schalter und Sensoren GmbH, Bietigheim-Bissingen (DE)

(72) Inventors: Ho-Hoai-Duc Nguyen, Bietigheim-Bissingen (DE); Thomas Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 1036 days.

(21) Appl. No.: 17/426,348

(22) PCT Filed: Jan. 22, 2020

(86) PCT No.: PCT/EP2020/051450
§ 371 (c)(1),
(2) Date: Jul. 28, 2021

(87) PCT Pub. No.: WO2020/156892
PCT Pub. Date: Aug. 6, 2020

(65) Prior Publication Data
US 2022/0099806 A1    Mar. 31, 2022

(30) Foreign Application Priority Data

Jan. 28, 2019   (DE) ................ 10 2019 101 966.4

(51) Int. Cl.
*G01S 7/48*   (2006.01)
*G01S 7/481*  (2006.01)
(Continued)

(52) U.S. Cl.
CPC ............ *G01S 7/4817* (2013.01); *G01S 17/42* (2013.01); *G01S 17/931* (2020.01)

(58) Field of Classification Search
None
See application file for complete search history.

(56) References Cited

U.S. PATENT DOCUMENTS 6,147,747 A      11/2000  Kavaya et al.
2008/0238760 A1*  10/2008  Mack .................... G01S 7/489
                                                    342/54

FOREIGN PATENT DOCUMENTS

CN    107037445 A    8/2017
CN    108885262 A    11/2018
(Continued)

OTHER PUBLICATIONS

International Search Report and Written Opinion in corresponding International Application No. PCT/EP2020/051450, mailed Apr. 15, 2020 (15 pages).

(Continued)

*Primary Examiner* — Hovhannes Baghdasaryan
(74) *Attorney, Agent, or Firm* — Osha Bergman Watanabe & Burton LLP

(57) ABSTRACT

The invention relates to a position capturing device (60) for a light signal redirection device (34, 40) of an optical measurement apparatus (12) for capturing objects (18) in a monitoring region (16), to a light signal redirection device (34, 40), to an optical measurement apparatus (12) and to a method for operating a position capturing device (60). The position capturing device (60) is designed for providing at least one position signal (68) corresponding to a deflection (72) of at least one redirection region (42a, 42b) of the light signal redirection device (34, 40). The at least one redirection region (42a, 42b) is used to redirect at least one light signal (20, 22) and is rotatable at least in a partially (Continued)

circumferential manner with respect to at least one pivot (46) in at least one direction of rotation (48). The position capturing device (60) has at least one position region (62), which is mechanically coupled to the at least one redirection region (42*a*, 42*b*) of the light signal redirection device (34, 40) in a manner such that the at least one position region (62) can rotate jointly with the at least one redirection region (42*a*, 42*b*). The at least one position region (62) is designed to provide at least one position signal (68) corresponding to a deflection (72) of the at least one redirection region (42*a*, 42*b*). The at least one position region (62) has at least one diffractive structure (63), which is designed such that light signals (20) can be shaped to form position light signals (68) depending on their incidence (52, 53) on the at least one position region (62).

12 Claims, 3 Drawing Sheets

(51) Int. Cl.
*G01S 17/42* (2006.01)
*G01S 17/931* (2020.01)

(56) References Cited

FOREIGN PATENT DOCUMENTS

| | | |
|---|---|---|
| DE | 102011000863 A1 | 8/2012 |
| DE | 102012019940 A1 | 4/2014 |
| DE | 102015219447 A1 | 4/2017 |
| DE | 102016122334 A1 | 5/2018 |
| DE | 102017130401 A1 | 7/2018 |
| DE | 102017205631 A1 | 10/2018 |
| DE | 102017116597 A1 | 1/2019 |
| DE | 102017116598 A1 | 1/2019 |
| DE | 102017218587 A1 | 4/2019 |
| EP | 0751402 A1 | 1/1997 |
| EP | 2983030 A2 | 2/2016 |
| WO | 2018153748 A1 | 8/2018 |

OTHER PUBLICATIONS

Kress Bernard et al.; "Novel optical encoder for harsh environments;" Proceedings of SPIE/IS & T, vol. 9202; Sep. 5, 2014; pp. 92020B1-92020B13 (13 pages).

Office Action Issued in Corresponding CN Application No. 202080021551.X, dated May 31, 2023. (26 pages with English Translation).

German Search Report issued in corresponding German Application No. 10 2019 101 966.4, dated Jan. 15, 2020 (8 pages).

Office Action issued in counterpart European Patent Application No. 20701730.2 dated Jun. 10, 2024 (9 pages).

\* cited by examiner

POSITION CAPTURING DEVICE FOR A LIGHT SIGNAL REDIRECTION DEVICE OF AN OPTICAL MEASUREMENT APPARATUS FOR CAPTURING OBJECTS, LIGHT SIGNAL REDIRECTION DEVICE, MEASUREMENT APPARATUS AND METHOD FOR OPERATING A POSITION CAPTURING DEVICE

TECHNICAL FIELD

The invention relates to a position capturing device for a light signal redirection device of an optical measurement apparatus for capturing objects in a monitoring region, which is designed for providing at least one position signal corresponding to a deflection of at least one redirection region of the light signal redirection device, wherein the at least one redirection region is used for redirecting at least one light signal and is rotatable at least in a partially circumferential manner with respect to at least one pivot in at least one direction of rotation.

The invention furthermore relates to a light signal redirection device for an optical measurement apparatus for capturing objects in a monitoring region, wherein the light signal redirection device has
- at least one redirection region, which is used to redirect at least one light signal and is rotatable at least in a partially circumferential manner with respect to a pivot in at least one direction of rotation, and
- at least one position capturing device, with which at least one position signal corresponding to a deflection of at least one redirection region can be provided.

The invention additionally relates to an optical measurement apparatus for capturing objects in a monitoring region, having
- at least one transmission device for transmitting light signals into the monitoring region,
- at least one receiving device with which light signals that have been reflected at objects that may be present in the monitoring region can be received,
- at least one light signal redirection device having at least one redirection region for redirecting light signals,
- at least one position capturing device, which is designed for providing at least one position signal corresponding to a deflection of at least one redirection region of the light signal redirection device,
- having at least one control and evaluation device, with which the at least one transmission device, the at least one receiving device and the at least one light signal redirection device can be controlled and with which received light signals and position signals can be evaluated.

The invention furthermore relates to a method for operating a position capturing device for a light signal redirection device of an optical measurement apparatus for capturing objects in a monitoring region, in which at least one position signal corresponding to a deflection of at least one redirection region of the light signal redirection device is provided, wherein the at least one redirection region is rotated at least in a partially circumferential manner with respect to at least one pivot in at least one direction of rotation and at least one light signal is redirected by the at least one redirection region.

PRIOR ART

DE 10 2015 219 447 A1 discloses a micromirror arrangement for diverting a light beam from a laser source, having a deflectable micromirror and a position detector, which is designed to provide a position signal corresponding to a deflection of the micromirror.

The invention is based on the object of designing a position capturing device, alight signal redirection device, an optical measurement apparatus and a method of the type mentioned in the introductory part in which a deflection of at least one redirection region of the light signal redirection device can be captured and/or set more simply and/or exactly.

DISCLOSURE OF THE INVENTION

This object is achieved with the position capturing device according to the invention in that
- the position capturing device has at least one position region, which is mechanically coupled to the at least one redirection region of the light signal redirection device in a manner such that the at least one position region can rotate jointly with the at least one redirection region.
- the at least one position region is designed to provide at least one position signal corresponding to a deflection of the at least one redirection region, and
- the at least one position region has at least one diffractive structure, which is designed such that light signals can be shaped to form position light signals depending on their incidence on the at least one position region.

According to the invention, at least one diffractive structure is used to shape the light signals that are incident on the at least one position region to form position light signals. The deflection of the at least one redirection region can be ascertained from the position light signals. In this way, the deflection of the at least one redirection region can be captured better, specifically more exactly and faster. Using the position capturing device according to the invention, the deflection of the at least one redirection region can be captured with a great degree of precision. Furthermore, the deflection can be ascertained independently of a swinging frequency or rotational speed of the at least one redirection region. Feedback via the deflection can take place in real time. Accordingly, closed-loop control of the optical measurement apparatus can be improved.

Diffractive structures can be easily realized and managed. Any outlay in terms of adjustment can be reduced compared to the position detector known from the prior art. The requirements in terms of the quality of the light signals can additionally be lowered. Furthermore, diffractive structures can be individually adapted to achieve the desired shaping of the light signals.

As is known, diffractive structures are structures at which light beams, in particular laser beams, can be shaped. This is accomplished in the form of diffraction at optical gratings. In this case, the diffractive structures can be designed individually. They can be implemented in a manner such that an incident light beam is correspondingly shaped in dependence on the angle of incidence and/or a point of incidence on the diffractive structure. Diffractive structures can be operated in transmission and/or reflection.

The invention can be used to implement a light signal redirection device for an optical measurement apparatus having a long-lasting and maintenance-free position capturing device. The position capturing device can furthermore be designed in a simple and compact manner. It is thus possible to achieve high flexibility without the need for a complex optical design.

Advantageously, the at least one redirection region can be driven to rotate or swing using at least one drive device. A swing of the at least one redirection region about the pivot within the meaning of the invention is a partially circumferential rotation during which the direction of rotation reverses when corresponding turning points are reached. The at least one position region is mechanically coupled to the at least one redirection region in a manner such that the at least one position region can rotate jointly with the at least one redirection region.

As the at least one redirection region rotates, an incidence of the light signals used for the position capturing on the at least one position region changes. The incidence is characterized by the angle of incidence and the point of incidence at which the light signal is incident on the at least one position region. To change the incidence, either the angle of incidence or the point of incidence or both can be changed.

Advantageously, at least one light signal that is incident on the at least one position region can be realized in the form of a light pulse. A start and an end of a light pulse can be determined, in particular measured.

Advantageously, the light signal redirection device can be designed as a micromirror arrangement having at least one micromirror that is rotatable or pivotable about a pivot. The mirror surface of the micromirror here forms a redirection region used to redirect at least one light signal. Alternatively, the light signal redirection device can have at least one diffractive structure as the redirection region. The at least one diffractive structure can be arranged on a substrate that for its part is rotatable or pivotable about the pivot. In this way, the at least one diffractive structure of the redirection region is rotatable or pivotable. At least one position region can be correspondingly arranged on the at least one micromirror or the at least one substrate. In this way, the at least one position region can be rotated or pivoted together with the respective redirection region, specifically a mirror surface or a further diffractive structure.

The optical measurement apparatus can advantageously also operate in accordance with a time-of-flight method, in particular a light pulse time-of-flight method. Optical measurement apparatuses operating in accordance with the light pulse time-of-flight method can be designed and referred to as time-of-flight systems (TOF), light detection and ranging systems (LiDAR), laser detection and ranging systems (LaDAR) or the like.

Here, a time of flight from the emission of a light signal using the transmission device and the receipt of the corresponding reflected light signal using a corresponding receiving device of the measurement apparatus is measured, and a distance between the measurement apparatus and the detected object is ascertained therefrom.

Advantageously, the optical measurement apparatus can be designed as a scanning system. In this context, a monitoring region can be sampled, that is to say, scanned, with light signals. To this end, the beam directions of the corresponding light signals can be swept, as it were, over the monitoring region. At least one light signal redirection device is used in this case.

Advantageously, the optical measurement apparatus can be designed as a laser-based distance measurement system. The laser-based distance measurement system can have, as the transmitter light source, at least one laser, in particular a diode laser. The at least one laser can be used to transmit in particular pulsed laser signals as light signals. The laser can be used to emit light signals in frequency ranges that are visible or not visible to the human eye. Accordingly, at least one receiving device can have a detector designed for the frequency of the emitted light, in particular an (avalanche) photodiode, a diode array, a CCD array or the like. The laser-based distance measurement system can advantageously be a laser scanner. A laser scanner can be used to scan a monitoring region with in particular pulsed laser signals.

The invention can be used advantageously in a vehicle, in particular a motor vehicle. The invention can advantageously be used in a land-based vehicle, in particular a passenger vehicle, a lorry, a bus, a motorcycle or the like, an aircraft and/or a watercraft. The invention can also be used in vehicles that can be operated autonomously or at least partially autonomously. The invention can also be used in a stationary measurement apparatus.

The measurement apparatus can be used to capture standing or moving objects, in particular vehicles, persons, animals, obstacles, road unevennesses, in particular potholes or rocks, roadway boundaries, free spaces, in particular free parking spaces, or the like.

Advantageously, the optical measurement apparatus can be part of a driver assistance system and/or of a chassis control system of a vehicle or be connected thereto. The information ascertained with the optical measurement apparatus can be used for controlling function components of the vehicle. The function components can be used to control in particular driving functions, in particular steering, a brake system and/or a motor, and/or signalling devices of the vehicle. For example, if an object is detected using the optical measurement apparatus, the corresponding function components can be used to steer the vehicle and/or change the speed thereof, in particular bring it to a stop, and/or output at least one signal.

In one advantageous embodiment, at least one diffractive structure can be designed as a diffractive optical element. Diffractive optical elements (DoE) can be manufactured individually and be adapted to the corresponding requirements. Diffractive optical elements can be used to achieve a targeted and individually prescribable shaping of the light signals.

In one further advantageous embodiment, at least one position region can have a transmissive effect for the light signals and/or at least one position region can have a reflective effect for the light signals.

Advantageously, the position capturing device can have either position regions that have a transmissive effect for the light signals or position regions that have a reflective effect for the light signals.

Alternatively, the position capturing device can have both at least one light-transmissive position region and also at least one reflective position region.

Position regions that are transmissive to light signals have the advantage that a light source for generating the light signals that are incident on the at least one position region can be arranged on the side of the at least one position region that lies opposite a position detector serving for receiving the position light signals. As a result, there are no zones that are obscured by the light source.

Reflective position regions have the advantage that they can radiate into the rearwards space, in which the at least one light source can be located.

In a further advantageous embodiment, at least one position region can be implemented in, at and/or on at least one substrate. The substrate can be used to increase mechanical stability. Furthermore, the substrate can be used as a mechanical retainer. For example, the substrate can in particular be mounted on at least one corresponding pivot about which it can be rotated.

Advantageously, the substrate can be transmissive to light signals. In this way, the at least one position region can also be arranged on a light exit side of the substrate.

The substrate can advantageously be made from glass, plastic or the like, on which the respective diffractive structure can be implemented by way of coating or removal, in particular etching or the like.

Advantageously, at least one substrate can be implemented in the form of a thin layer.

Advantageously, at least one position region can be arranged on the light entry side of a substrate and/or at least one position region can be arranged on the light exit side of a substrate.

Using position regions on the light entry side, the corresponding shaping of the light signals can take place before they enter the substrate.

Using position regions on the light exit site, the light signals can be shaped as they leave the substrate.

In a further advantageous embodiment, the position capturing device can have or use at least one light source, with which light signals can be generated that can be transmitted at least in part onto at least one position region. In this way, the light signals can be transmitted onto the at least one position region in a targeted manner.

Advantageously, the position capturing device can use as the light source a transmitter light source of a transmission device of the optical measurement apparatus. In this way, a transmitter light source that is already present can be used.

Advantageously, a light beam of the transmitter light source can be divided or expanded in particular by means of at least one optical system. In this way, part of the light beam can be transmitted into the monitoring region, while another part of the light beam is transmitted onto at least one position region. The division or the expansion of the light beam coming from the transmitter light source can be accomplished with the aid of at least one optical system, in particular at least one optical lens.

Alternatively or additionally, the position capturing device can advantageously have its own light source. In this way, the position capturing device can be operated independently of the transmission device.

Advantageously, at least one light source can have at least one laser. Light pulses can be sent in a targeted manner using a laser. The at least one light source can consist of at least one laser. Alternatively, at least one laser can be part of the at least one light source.

Advantageously, at least one light source can have at least one surface emitter (VCSEL), an edge emitter, a fibre laser, a diode laser or a laser of a different type, in particular semiconductor laser. Such light sources can be implemented in a simple and compact manner.

Advantageously, the position capturing device can have or use at least one optical system, which is arranged between at least one light source and at least one position region. The optical system can be used to correspondingly shape, in particular focus and/or expand, the light signals.

The position capturing device can advantageously use at least one optical system of the transmission device and/or of a receiving device of the optical measurement apparatus. It is thus possible to dispense with separate optical systems.

Alternatively or additionally, the position capturing device can use at least one dedicated optical system. In this way, the position capturing device can be operated independently of the transmission device and/or of the receiving device.

Advantageously, at least one optical system can have at least one optical lens. Light signals can be shaped using an optical lens.

In a further advantageous embodiment, the position capturing device can have or use at least one receiver, with which position light signals can be received and converted into electrical signals.

Advantageously, the position capturing device can use at least one receiver of a receiving device of the optical measurement apparatus. In this way, a receiver that is already present can be used.

Alternatively or additionally, the position capturing device can advantageously have its own receiver. In this way, the position capturing device can be operated independently of the receiving device.

Accordingly, at least one receiver that is used by the position capturing device can have at least one detector, in particular an (avalanche) photodiode, a diode array, a CCD array or the like. An array can be used to receive and process the position light signals in a spatially resolved manner.

In a further advantageous embodiment, at least one position region can be designed such that it can be used to provide light signals with a code that corresponds to the incidence of the light signals. In this way, encoded position light signals can be generated that can be decoded on the receiver side. The encoded position light signals can here correspond to the deflection of the at least one redirection region.

The position capturing device can advantageously have at least one code table for encoding the light signals and/or for decoding the position light signals. In this way, the deflection of the at least one redirection region can be ascertained more quickly and more efficiently.

The light signals can advantageously be encoded in a binary manner with the at least one diffractive structure. Binary codes can be generated, transmitted and decoded in a simple and reliable manner.

In a further advantageous embodiment, at least one diffractive structure of at least one position region can be designed such that light signals can be shaped to form position light signals depending on their angles of incidence on the at least one diffractive structure. In this way, the deflection of the at least one redirection region can be ascertained directly from the angle of incidence.

In a further advantageous embodiment, at least one position region can have a plurality of diffractive structures, which are arranged one next to the other at different distances from the at least one pivot and have different light-signal-shaping properties, and/or at least one position region can have at least one diffractive structure, which has, at different distances from the at least one pivot, different light-signal-shaping properties. In this way, different shaping of the light signals can be obtained at different points of incidence. The deflection of at least one redirection region can thus be ascertained from the change of the point of incidence of the light signals on the at least one position region during the rotation of the redirection region.

Advantageously, at least one position region can have a plurality of diffractive structures, which can be arranged one next to the other. In this way, a corresponding amount of different individual shapes of the light signals can be realized along the extent of the at least one position region.

Advantageously, a light-signal-shaping property of at least one position region can vary over its extent in at least one direction of extent. In this way, a variation of the shaping of the light signals can be realized in particular continuously in dependence on the point of incidence.

In one further advantageous embodiment, at least one light signal can be directed to at least one of the pivots and/or at least one light signal can be directed next to at least one of the pivots.

At least one light signal can be directed onto the at least one pivot. In this way, the deflection of the at least one redirection region can be ascertained directly from the angle of incidence of the light signals on the corresponding diffractive structure of the at least one position region. In addition, the size of the diffractive structure can be delimited to the vicinity around the pivot.

Alternatively or additionally, at least one light signal can be directed next to at least one pivot. In this way, the deflection of the at least one redirection region can be ascertained from the angle of incidence and/or the point of incidence of the light signals on the at least one position region.

The object is furthermore achieved according to the invention in the case of the light signal redirection device in that
- the position capturing device has at least one position region, which is mechanically coupled to the at least one redirection region of the light signal redirection device in a manner such that the at least one position region can rotate jointly with the at least one redirection region.
- the at least one position region is designed to provide at least one position signal corresponding to a deflection of the at least one redirection region, and
- the at least one position region has at least one diffractive structure, which is designed such that light signals can be shaped to form position light signals depending on their incidence on the at least one position region.

According to the invention, the light signals are shaped using the at least one diffractive structure to form position light signals. In this way, a deflection of the at least one redirection region can be captured more easily and more exactly.

The object is additionally achieved according to the invention in the case of the optical measurement apparatus in that
- the position capturing device has at least one position region, which is mechanically coupled to the at least one redirection region of the light signal redirection device in a manner such that the at least one position region can rotate jointly with the at least one redirection region,
- the at least one position region is designed to provide at least one position signal corresponding to a deflection of the at least one redirection region, and
- the at least one position region has at least one diffractive structure, which is designed such that light signals can be shaped to form position light signals depending on their incidence on the at least one position region.

Advantageously, the at least one position capturing device can be designed as a position capturing device according to the invention.

The object is furthermore achieved according to the invention in the case of the method in that
- the position capturing device has at least one position region, which is mechanically coupled to the at least one redirection region of the light signal redirection device and is rotated jointly with the at least one redirection region,
- a position signal corresponding to a deflection of the at least one redirection region is provided with the at least one position region, and,

- using at least one diffractive structure of the at least one position region, light signals are shaped to form position light signals in dependence on their incidence on the at least one position region.

According to the invention, at least one diffractive structure is used to shape the light signals that are incident on the at least one position region to form position light signals.

Moreover, the features and advantages indicated in connection with the position capturing device according to the invention, the light signal redirection device according to the invention, the measurement apparatus according to the invention and the method according to the invention and the respective advantageous configurations thereof apply here in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which exemplary embodiments of the invention will be explained in more detail with reference to the drawing. A person skilled in the art will also expediently consider the features which have been disclosed in the drawing, the description and the claims individually and combine them to form further meaningful combinations. In the drawing:

In the figures, identical components are provided with the same reference numerals.

EMBODIMENT(S) OF THE INVENTION

Figure 1:
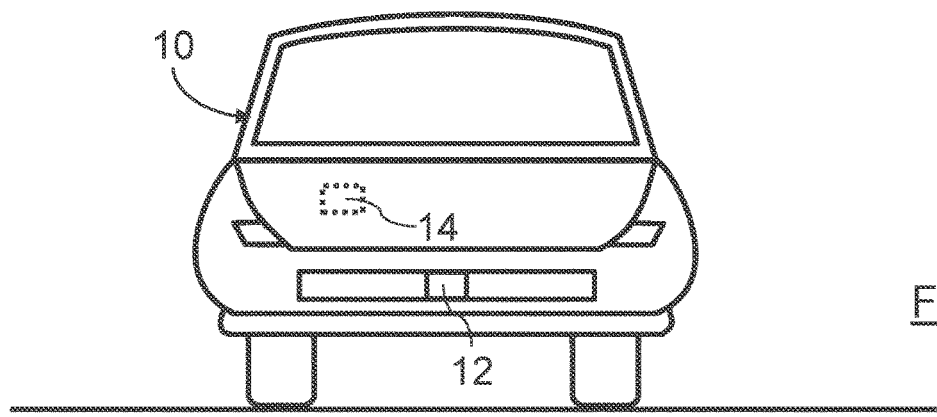
FIG. 1 shows a front view of a vehicle having an optical measurement apparatus, which is connected to a driver assistance system.

FIG. 1 illustrates a vehicle 10, for example a passenger vehicle, in the front view. The vehicle 10 has an optical measurement apparatus 12, for example a laser scanner. The optical measurement apparatus 12 is arranged for example in a front bumper of the vehicle 10. The vehicle 10 furthermore has a driver assistance system 14, with which the vehicle 10 can be operated autonomously or partially autonomously. The optical measurement apparatus 12 is functionally connected to the driver assistance system 14, with the result that information that can be acquired with the measurement apparatus 12 can be transmitted to the driver assistance system 14. The measurement apparatus 12 can be used to monitor a monitoring region 16, located, in the exemplary embodiment shown, in the driving direction in front of the motor vehicle 10, for objects 18.

The measurement apparatus 12 operates in accordance with a time-of-flight method. For this purpose, light signals 20, for example in the form of laser pulses, are transmitted into the monitoring region 16. Light signals 22, which have been reflected at an object 18 that may be present, are received by the measurement apparatus 12. A distance of the object 18 from the measurement apparatus 12 is ascertained from a time of flight between the transmission of the light signals 20 and the receipt of the reflected light signals 22. The beam direction of the light signals 20 is swept over the monitoring region 16 during the measurements. The monitoring region 16 is scanned in this way. A direction of the object 18 relative to the measurement apparatus 12 is ascertained from the beam direction of the light signals 20, which are reflected at the object 18.

The measurement apparatus 12 comprises a transmission device 24, a receiving device 26 and an electronic control and evaluation device 28.

Figure 2:
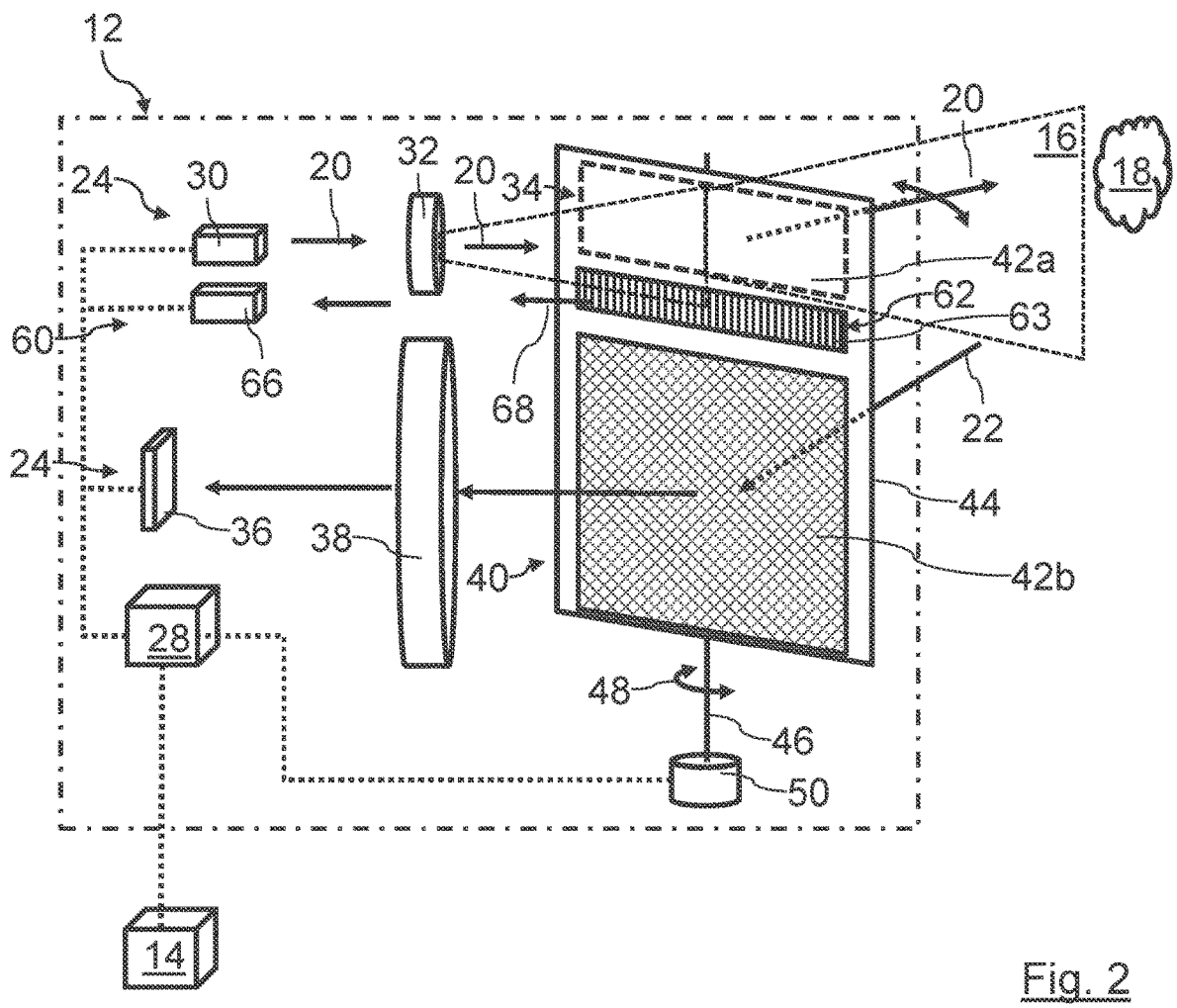
FIG. 2 shows an optical measurement apparatus according to a first exemplary embodiment having a driver assistance system, which can be used in the vehicle from FIG. 1.

The transmission device 24, which is shown by way of example in FIG. 2, comprises a transmission light source 30, an optical system in the form of a transmission lens 32 and a transmitter light signal redirection device 34.

The receiving device 26 comprises an optical receiver 36, a receiver lens 38 and a receiver light signal redirection device 40.

The transmitter light source 30 has, for example, one laser. Pulsed laser signals can be generated in the form of light signals 20 using the transmission light source 30.

The light signals 20 can be expanded in a direction transversely to their beam direction using the transmitter lens 32. This is indicated in FIG. 2 by way of a dashed trapezium. In the exemplary embodiment shown, the light signals 20 are expanded using the transmitter lens 32 in the direction of a pivot 46, for example in the vertical direction.

The transmitter light signal redirection device 34 is located in the beam path of the transmitter light source 30 downstream of the transmitter lens 32. The beam direction of the light signals 20 can be swept in one plane with the aid of the transmitter light signal redirection device 34. For example, the sweeping plane extends perpendicular to the direction in which the light signals 20 are expanded using the transmitter lens 32, that is to say for example horizontally. In this way, the monitoring region 16 can be scanned in the horizontal direction using light signals 20 that follow one behind the other.

Reflected light signals 22 are redirected, using the receiver light signal redirection device 14, out of the monitoring region 16 onto the receiver lens 38. The reflected light signals 22 are imaged onto the receiver 36 using the receiver lens 38.

The receiver 36 is designed, for example, as a CCD chip, array, photodiode or a detector of a different type for receiving the reflected light signals 22 in the form of laser pulses. The received light signals 22 are converted to electronic signals using the receiver 36. The electronic signals are transmitted to the control and evaluation device 28.

The transmission device 24 and the receiving device 26 are controlled by the control and evaluation device 28. Furthermore, the electronic signals obtained from the received light signals 22 are evaluated using the control and evaluation devices 28. The time of flight and, on the basis thereof, the distance of the object 18 at which the light signals 22 have been reflected are ascertained using the control and evaluation devices 28. In addition, the direction of the object 18 is ascertained using the control and evaluation devices 28.

The transmitter light redirection device 24 comprises, by way of example, a transmitter redirection region 42a in the form of a diffractive structure. The diffractive structure is implemented for example as what is known as a diffractive optical element. The transmitter redirection region 42a is implemented for example on a rectangular, flat substrate 44. The substrate 44 is, for example, a glass plate or plastics plate, also in the form of a thin film, which is transmissive to the light signals 20. The transmitter redirection region 42a is arranged on the side of the substrate 44 facing away from the transmission lens 32. The transmitter redirection region 42a extends, in the form of a strip, nearly over the entire width of the substrate 44 transversely to the pivot 46.

The substrate 44 is mounted on the pivot 46. The pivot 46 for its part is driven by a motor 50, with the result that the substrate 44 and consequently the redirection region 42a are pivoted back and forth about the pivot 46. The pivot direction of the substrate 44 and thus of the redirection region 42a is indicated in FIG. 2 by way of a double-headed arrow 48.

The motor 50 is, for example, a moving-coil motor. The motor 50 is connected in a controllable manner to the control and evaluation device 28. Rather than a moving-coil motor, it is also possible to use a drive device of a different type as the motor 50.

Figure 3:
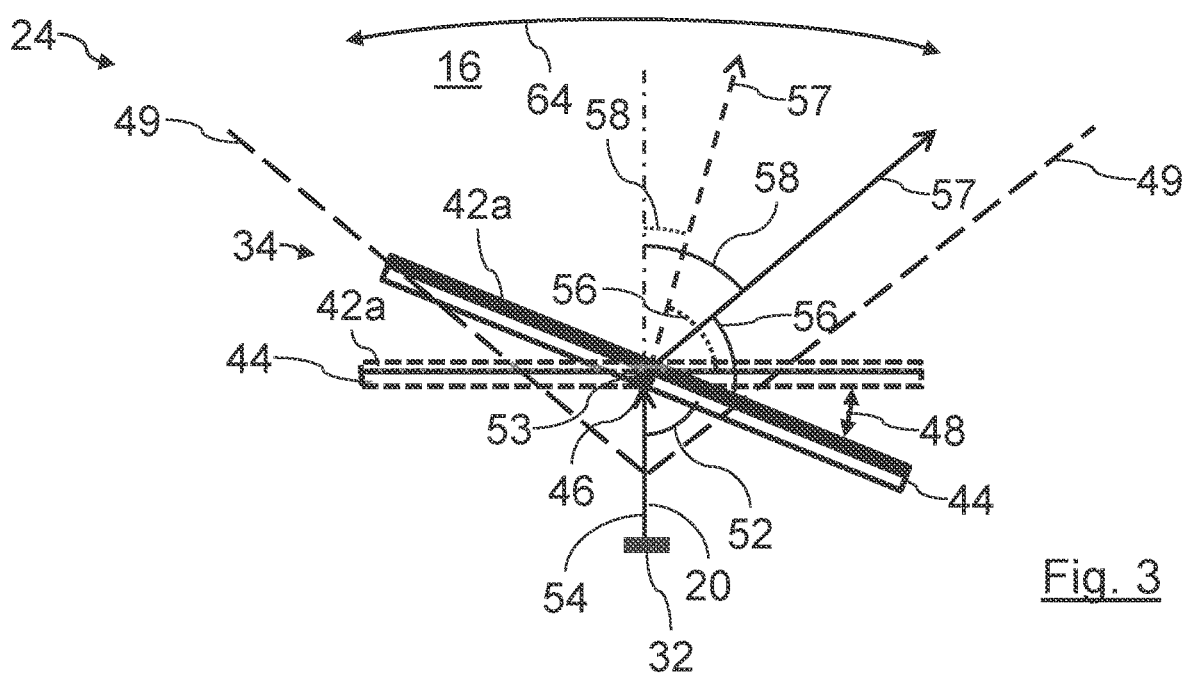
FIG. 3 shows a light signal redirection device of a transmission device of the measurement apparatus from FIG. 2 viewed in the direction of a pivot with which the light signal redirection device can be rotated.

The transmitter redirection region 42a is located, as is also shown in FIG. 3, in the beam path of the light signals 20 of the transmission device 24. FIG. 3 shows the transmitter lens 32 and the transmitter light signal redirection device 34 viewed from above in the direction of the pivot 46. The light signals 20 are diffracted depending on their incidence on the redirection region 42a. The incidence is defined by an angle of incidence 52 and a point of incidence 53. The angle of incidence 52 is the angle between an incidence beam direction 54 of the light signals 20 and the entry surface of the transmitter redirection region 42a.

The diffractive structure of the transmitter redirection region 42a is embodied, for example, such that an angle of diffraction 56 on the exit side relative to the exit surface of the redirection region 42a is constant independently of the angle of incidence 52. A diversion angle 58 between the incidence beam direction 54 and the exit beam direction 57 of the redirected light signals 20 is composed of the angle of incidence 52 and the constant angle of diffraction 56. In order to change the diversion angle 58, the transmitter redirection region 42a is pivoted about the pivot 46, which merely leads to a change in the angle of incidence 52. By pivoting the transmitter redirection region 42a, the exit beam direction 57 of the light signal 20 in the monitoring region 16 is pivoted. A field of view 64 defining the monitoring region 16 can be scanned with the aid of the pivotable transmitter redirection region 42a. The field-of-view boundaries 49 of the field of view 64 are indicated in FIG. 3 by dashed lines.

The receiver light signal redirection device 40 comprises, as is shown in FIG. 2, a receiver redirection region 42b. The receiver redirection region 42b is a diffractive structure, for example a diffractive optical element.

In the exemplary embodiment shown, the receiver redirection region 42b is implemented on the same substrate 44 on which the transmitter redirection region 42a is also implemented. The receiver redirection region 42b is arranged on the side of the substrate 44 facing the receiver lens 38. The receiver redirection region 42b extends almost over the entire width of the substrate 44 transversely to the pivot 46. The extent of the receiver redirection region 42b in the direction of the pivot 46 is greater than the corresponding extent of the transmitter redirection region 42a.

In the exemplary embodiment shown, the transmission light redirection device 34 and the receiver light signal redirection device 40 are mechanically coupled to one another with the aid of the common substrate 44. In this way, the transmitter redirection region 42a and the receiver redirection region 42b can be pivoted together with the pivot 46. To this end, only a single motor 50 is necessary.

The receiver redirection region 42b is designed such that reflected light signals 22 coming from the monitoring region 16 are directed by the former in each pivot position of the receiver redirection region 42b, or the substrate 44, onto the receiver lens 38. The receiver lens 38 is used to focus the redirected reflected light signals 22 onto the receiver 36.

The measurement apparatus 12 moreover has a position capturing device 60. The position capturing device 60 can be used to ascertain a deflection of the substrate 44 and thus of the transmitter light redirection device 34, or the transmitter redirection region 42a, and the receiver light signal redirection devices 40, or the receiver redirection region 42b.

The position capturing device 60 comprises a position region 62 in the form of a diffractive structure 63, for example a diffractive optical element, and an optical position detector 66.

Figure 4:
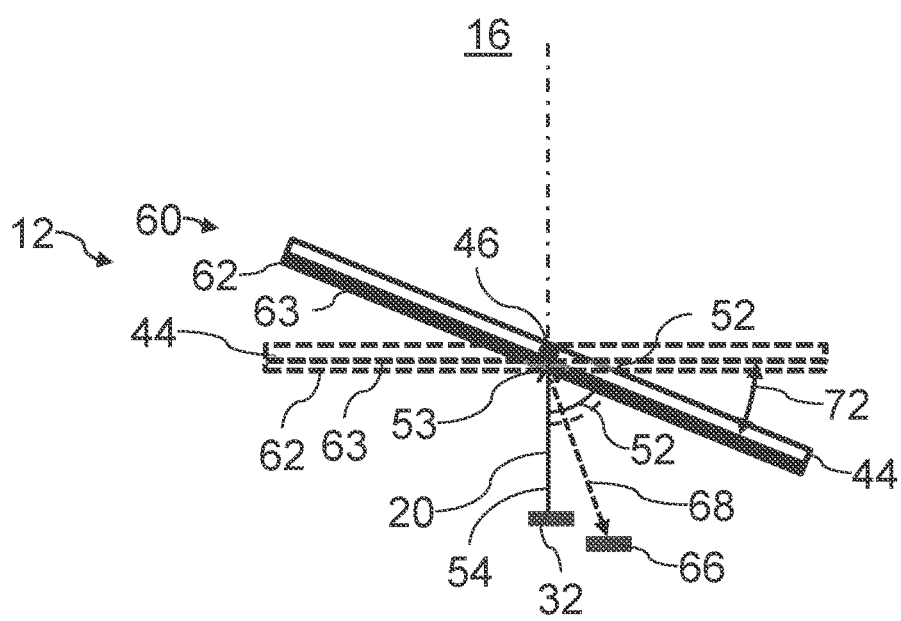
FIG. 4 shows a position capturing device of the optical measurement apparatus from FIGS. 1 to 3.

The position region 62 is arranged on the side of the substrate 44 facing the transmitter light source 30. The position region 62 is located, viewed in the direction of the pivot 46, for example between the transmitter redirection region 42a and the receiver redirection region 42b. The position region 62 extends, as is also shown in FIG. 4, as a stripe for example perpendicular to the pivot 46 almost over the entire width of the substrate 44.

The position region 62 is arranged sufficiently close to the transmitter redirection region 42a that part of the light signal 20, which has been expanded using the transmitter lens 32, is incident on the position region 62, as shown in FIG. 2.

The diffractive structure 63 of the position region 62 is thus designed such that light signals 20 that are incident on the position region 62 are encoded in dependence on the angle of incidence 52 of the light signals 20 on the position region 62. The encoding here characterizes the respective angle of incidence 52. In the exemplary embodiment shown, the angle of incidence 52 corresponds to a pivot angle 72 of the substrate 44, and thus of the transmitter redirection regions 42a and the receiver redirection region 42b, which characterizes the deflection thereof.

Figure 5:
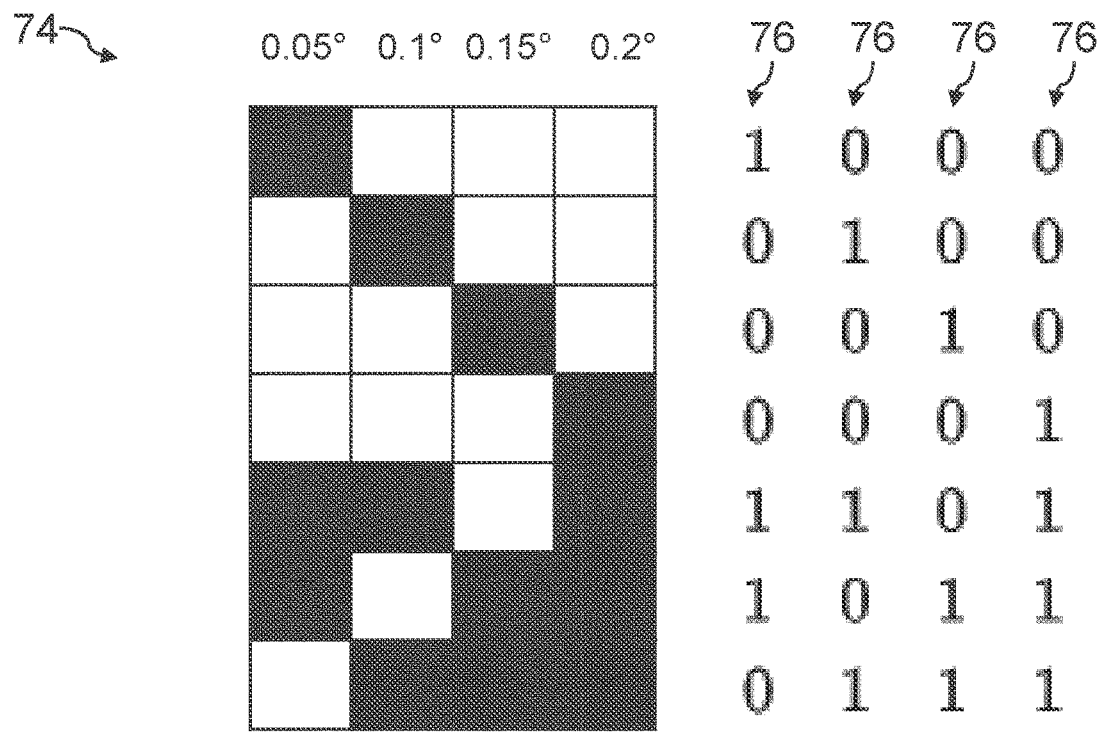
FIG. 5 shows a code table of the position capturing device from FIG. 4.

The encoding takes place in a binary code 76 for example in accordance with a code table 74 shown in FIG. 5. By way of example, a pivot angle 72 of 0.05° corresponds to the binary code 76 "0.1000110". A pivot angle 72 of 0.1° corresponds to the binary code 76 "0100101". A pivot angle 72 of 0.15° corresponds to the binary code 76 "0010011". A pivot angle 72 of 0.2° corresponds to the binary code 76 "0.0001111".

In the exemplary embodiment shown, the light signals 20 are encoded and reflected as position light signals 68 and transmitted to the position detector 66.

The position detector 66 is arranged, by way of example, next to the transmitter light source 30 at the same height. The position detector 66 can be designed for example as an individual detector, a line-scan detector or an area-scan detector. For this purpose, for example a CCD chip, a photodiode or the like can be used.

The encoded light signals 68 are converted to electrical position signals using the position detector 66 and transmitted to the control and evaluation devices 28. The control and evaluation devices 28 are used to decode the electrical position signals with reference to the code table 74. The pivot angle 72 of the position region 62 and thus of the substrate 44, of the transmitter redirection region 42a and of the receiver redirection region 42b is ascertained from the decoded electrical position signals. An instantaneous deflection of the transmitter light redirection device 34 and of the receiver light signal redirection device 40 is ascertained with the aid of the position capturing device 60.

In an exemplary embodiment (not shown), the position region 62 can be designed for transmission rather than for the reflection of the light signals. In this case, the position detector 66 is disposed on the side of the position region 62 that lies opposite the transmitter light source 30.

During the operation of the measurement apparatus 12, pulsed light signals 20 are transmitted using the transmission light source 30 through the transmission lens 32 onto the transmission redirection region 42a and the position region 62. The light signals 20 are here directed to the pivot 46.

The transmitter redirection region 42a is used to transmit the light signals 20 into the monitoring region 16 in dependence on the angle of incidence 52, that is to say in dependence on the deflection of the substrate 44.

FIG. 3 shows the transmitter redirection region 42a in two deflections. The light signals 22 reflected at the object 18 are directed onto the receiver lens 38 using the receiver redirection region 42b. The reflected light signals 22 are focused onto the receivers 36 using the receiver lens 38. Using the receiver 36, the reflected light signals 22 are converted to electrical signals and transmitted to the control and evaluation device 28. Using the control and evaluation devices 28, the time of flight of the light signals 20 and of the corresponding reflected light signals 22 is ascertained and a distance of the captured object 18 from the measurement apparatus 12 is determined therefrom.

Furthermore, the position region 62 is used to transmit the portion of the light signals 20 that is incident thereon in an encoded manner and as position light signals 68 to the position detector 66. FIG. 4 shows the position region 62 in the two deflections, corresponding to FIG. 3. The pivot angle 72 is determined from the position light signals 68. The direction of the captured object 18 relative to the measurement apparatus 12 is ascertained from the pivot angle 72, that is to say from the deflection of the transmitter light signal redirection device 34 and the receiver light signal redirection device 40.

During the measurement, the pivot 46 is rotated by the motor 50 and consequently the substrate 44 is pivoted back and forth. In this way, pulsed light signals 20 that have been emitted one after the other undergo different diversions into the monitoring region 16. In this way, the monitoring region 16 is scanned with the pulsed light signals 20.

Figure 6:
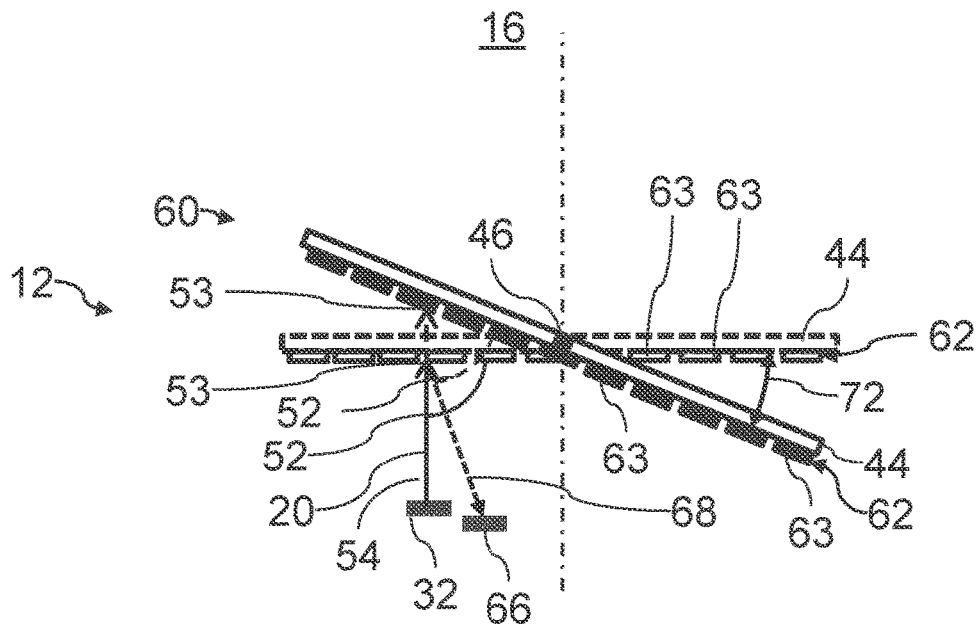
FIG. 6 shows a position capturing device of an optical measurement apparatus according to a second exemplary embodiment.

FIG. 6 shows a position capturing device 60 according to a second exemplary embodiment. The elements that are similar to those of the position capturing device 60 according to the first exemplary embodiment from FIGS. 1 to 5 are provided with the same reference signs. In contrast to the first exemplary embodiment, the position region 62 of the position capturing device 60 according to the second exemplary embodiment has a plurality of diffractive structures 53 in the form of diffractive optical elements. The diffractive structures 53 are arranged one next to the other at different distances from the pivot 46. The diffractive structures 53 have different light-signal-shaping properties. In this way, when a light signal 20 is incident on one of the diffractive structures 53, it is correspondingly individually encoded.

Furthermore, the light signals 20 in the second exemplary embodiment are directed next to the pivot 46. When the substrate 44 is rotated about the pivot 46, the light signals 20 are incident on the position region 62 at different points of incidence 53 and thus on different diffractive structures 53. In the deflection with a pivot angle 72 of 0°, shown in FIG. 6, in which the substrate 44 is illustrated in dashed lines, the light signals 20 are incident for example on the fourth diffractive structure 53 from the left. In the deflection with a greater pivot angle 72, the light signals 20 are incident for example on the third diffractive structure 53 from the left. The light signals 20 are encoded using the corresponding diffractive structures 53 in dependence on the point of incidence 53 on the position region 62 and transmitted to the receiver 66.

The invention claimed is:

1. A position capturing device for a light signal redirection device of an optical measurement apparatus for capturing an object in a monitoring region, the position capturing device being configured to:
provide at least one position signal corresponding to a deflection of at least one redirection region of the light signal redirection device,
wherein the at least one redirection region is used for redirecting at least one light signal and is rotatable at least in a partially circumferential manner with respect to at least one pivot in at least one direction of rotation, the position capturing device comprising:
at least one position region, which is mechanically coupled to the at least one redirection region of the light signal redirection device in a manner such that the at least one position region rotates jointly with the at least one redirection region,
wherein the at least one position region has a plurality of diffractive structures, which are arranged one next to the other at different distances from the at least one pivot and have different light-signal-shaping properties, or at least one position region has at least one diffractive structure, which has, at different distances from the at least one pivot, different light-signal-shaping properties, and
wherein the at least one light signal is encoded corresponding to the light-signal-shaping properties of each diffractive structure.

2. The position capturing device according to claim 1, wherein at least one diffractive structure is configured as a diffractive optical element.

3. The position capturing device according to claim 1, wherein at least one position region acts to be transmissive to the light signals or at least one position region acts to be reflective for the light signals.

4. The position capturing device according to claim 1, wherein at least one position region is implemented in, at, or on at least one substrate.

5. The position capturing device according to claim 1, wherein the position capturing device has or uses at least one light source, with which light signals can be generated that can be transmitted at least in part onto at least one position region.

6. The position capturing device according to claim 1, wherein the position capturing device has or uses at least one receiver, with which position light signals is received and converted into electrical signals.

7. The position capturing device according to claim 1, wherein at least one position region is configured to encode light signals with a code that corresponds to the incidence of the light signals.

8. The position capturing device according to claim 1, wherein at least one diffractive structure of at least one position region is configured so that light signals are shaped to form position light signals depending on their angles of incidence on the at least one diffractive structure.

9. The position capturing device according to claim 1, wherein at least one light signal is directed onto at least one of the pivots or at least one light signal is directed next to at least one of the pivots.

10. A light signal redirection device for an optical measurement apparatus for capturing objects in a monitoring region, the light signal redirection device comprising:
at least one redirection region, which is used to redirect at least one light signal and is rotatable at least in a partially circumferential manner with respect to a pivot in at least one direction of rotation; and
at least one position capturing device, with which at least one position signal corresponding to a deflection of at least one redirection region is provided,
wherein the position capturing device has at least one position region, which is mechanically coupled to the at least one redirection region of the light signal redirection device in a manner such that the at least one position region rotates jointly with the at least one redirection region,
wherein the at least one position region is configured to provide at least one position signal corresponding to a deflection of the at least one redirection region,
wherein the at least one position region has at least one diffractive structure, which is configured such that light signals is shaped to form position light signals depending on their incidence on the at least one position region, and
wherein the at least one position region is implemented in, at, or on at least one transmissive substrate.

11. An optical measurement apparatus for capturing objects in a monitoring region, comprising:
at least one transmission device for transmitting light signals into the monitoring region;
at least one receiving device with which light signals that have been reflected at objects that may be present in the monitoring region is received;
at least one light signal redirection device having at least one redirection region for redirecting light signals;
at least one position capturing device for providing at least one position signal corresponding to a deflection of at least one redirection region of the light signal redirection device; and
at least one control and evaluation device, with which the at least one transmission device, the at least one receiving device and the at least one light signal redirection device are controlled and with which received light signals and position signals are evaluated,
wherein the position capturing device has at least one position region, which is mechanically coupled to the at least one redirection region of the light signal redirection device in a manner such that the at least one position region rotates jointly with the at least one redirection region,
wherein the at least one position region is configured to provide at least one position signal corresponding to a deflection of the at least one redirection region,
wherein the at least one position region has at least one diffractive structure, which is designed such that light signals can be shaped to form position light signals depending on their incidence on the at least one position region, and
wherein the at least one position region is implemented in, at, or on at least one transmissive substrate.

12. A method for operating a position capturing device for a light signal redirection device of an optical measurement apparatus for capturing objects in a monitoring region, the method comprising:
- providing at least one position signal corresponding to a deflection of at least one redirection region of the light signal redirection device;
- rotating the at least one redirection region at least in a partially circumferential manner with respect to at least one pivot in at least one direction of rotation; and
- redirecting at least one light signal by the at least one redirection region,
- wherein the position capturing device has at least one position region mechanically coupled to the at least one redirection region of the light signal redirection device and is rotated jointly with the at least one redirection region,
- wherein the at least one position region has a plurality of diffractive structures, which are arranged one next to the other at different distances from the at least one pivot and have different light-signal-shaping properties, or at least one position region has at least one diffractive structure, which has, at different distances from the at least one pivot, different light-signal-shaping properties, and
- wherein the at least one light signal is encoded corresponding to the light-signal-shaping properties of each diffractive structure;
- providing a position signal corresponding to a deflection of the at least one redirection region with the at least one position region; and
- using at least one diffractive structure of the at least one position region, shaping light signals to form position light signals in dependence on their incidence on the at least one position region.

* * * * *